(12) United States Patent
Leng et al.

(10) Patent No.: US 9,520,977 B2
(45) Date of Patent: Dec. 13, 2016

(54) METHOD AND APPARATUS FOR DATA TRANSMISSION IN COMMUNICATION NETWORK

(71) Applicant: Alcatel Lucent, Boulogne Billancourt (FR)

(72) Inventors: Xiaobing Leng, Shanghai (CN); Wu Zheng, Shanghai (CN); Zhaojun Xu, Shanghai (CN); Gang Shen, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/371,525

(22) PCT Filed: Dec. 20, 2012

(86) PCT No.: PCT/IB2012/002868
§ 371 (c)(1),
(2) Date: Jul. 10, 2014

(87) PCT Pub. No.: WO2013/104951
PCT Pub. Date: Jul. 18, 2013

(65) Prior Publication Data
US 2014/0376473 A1    Dec. 25, 2014

(30) Foreign Application Priority Data
Jan. 10, 2012    (CN) .......................... 2012 1 0006487

(51) Int. Cl.
*H04L 5/00*    (2006.01)
*H04W 76/02*   (2009.01)
(Continued)

(52) U.S. Cl.
CPC ............ *H04L 5/0053* (2013.01); *H04W 28/08* (2013.01); *H04W 76/02* (2013.01); *H04W 72/048* (2013.01);
(Continued)

(58) Field of Classification Search
CPC ..................................................... H04L 5/0053
(Continued)

(56) References Cited

U.S. PATENT DOCUMENTS

| 8,509,114 B1* | 8/2013 | Szajdecki | H04J 3/22 370/254 |
| 8,781,797 B1* | 7/2014 | Oltman | G06F 11/261 455/115.1 |

(Continued)

FOREIGN PATENT DOCUMENTS

| EP | 2 475 219 A1 | 7/2012 |
| JP | 2007221736 A | 8/2007 |

(Continued)

OTHER PUBLICATIONS

Tansir Ahmed et al., "Multi Access Data Network Connectivity and IP Flow Mobility in Evolved Packet System (EPS)," Wireless Communications and Networking Conference (WCNC), IEEE, pp. 1-6, XP031706546, Apr. 18, 2010.*

(Continued)

*Primary Examiner* — Parth Patel
(74) *Attorney, Agent, or Firm* — Fay Sharpe, LLP

(57) ABSTRACT

The present invention provides a method and apparatus for data transmission in a communication network. In the present invention, additional frequency spectrum resources in an assistant wireless network are introduced by constructing emulation data channels for use by a user equipment in a cellular network, thereby expanding the resources in the cellular network and enhancing throughput of the cellular (Continued)

network. In addition, the original control channels between the base station and the user equipment in the cellular network are maintained, enabling the user equipment to have the quality of service QoS in the cellular network when using the assistant wireless network to transmit data, and sparing the user equipment from handover operations in establishing or releasing the emulation data channels, thereby complicated network control and management mechanisms used for the handover are not needed and thus the user experience is further enhanced. Moreover, it is relatively easy to be implemented and cost efficient.

18 Claims, 9 Drawing Sheets

(51) Int. Cl.
*H04W 28/08* (2009.01)
*H04W 88/10* (2009.01)
*H04W 72/04* (2009.01)
*H04W 72/08* (2009.01)

(52) U.S. Cl.
CPC ....... *H04W 72/0486* (2013.01); *H04W 72/085* (2013.01); *H04W 88/10* (2013.01)

(58) Field of Classification Search
USPC .......................................................... 370/329
See application file for complete search history.

(56) References Cited

U.S. PATENT DOCUMENTS

| | | | | | |
|---|---|---|---|---|---|
| 8,787,363 | B2* | 7/2014 | Dharanikota | ........ | H04Q 11/045 370/352 |
| 8,938,201 | B2* | 1/2015 | Boulton | ................ | G01S 5/0221 455/67.11 |
| 2004/0185777 | A1* | 9/2004 | Bryson | ................... | H04L 29/00 455/41.1 |
| 2006/0075073 | A1* | 4/2006 | Bichot | .................... | H04L 12/14 709/220 |
| 2006/0286984 | A1* | 12/2006 | Bonner | ................. | H04W 36/14 455/445 |
| 2007/0002753 | A1* | 1/2007 | Bailey | .................... | H04L 43/50 370/241 |
| 2007/0268840 | A1* | 11/2007 | Njedjou | ................ | H04W 48/18 370/254 |
| 2007/0297439 | A1* | 12/2007 | Ihattula | ................. | H04W 48/17 370/445 |
| 2008/0049694 | A1* | 2/2008 | Kinoshita | ............. | H04W 88/06 370/338 |
| 2008/0130555 | A1* | 6/2008 | Kalhan | ................. | H04W 88/10 370/329 |
| 2010/0135272 | A1* | 6/2010 | Dayal | ................... | H04W 88/10 370/343 |
| 2010/0277300 | A1* | 11/2010 | Cohn | ................... | G08B 25/001 340/506 |
| 2012/0127903 | A1* | 5/2012 | Estevez | ............ | H04W 52/0209 370/311 |
| 2012/0250616 | A1* | 10/2012 | Hu | ...................... | H04W 76/025 370/328 |
| 2013/0029639 | A1* | 1/2013 | Lee | ....................... | H04W 92/02 455/411 |
| 2015/0131470 | A1* | 5/2015 | Boulton | ............... | H04W 24/06 370/252 |

FOREIGN PATENT DOCUMENTS

| | | | |
|---|---|---|---|
| JP | 2009-500882 A | 1/2009 | |
| WO | 2005/115034 A1 | 12/2005 | |
| WO | WO 2006/012018 A1 | 2/2006 | |
| WO | WO2006012018 * | 2/2006 | ............ H04L 12/28 |
| WO | WO 2010/121511 A1 | 10/2010 | |

OTHER PUBLICATIONS

Savio Dimatteo et al., "Cellular Traffic Offloading through WiFi Networks," The IEEE 8th International Conference on Mobile Adhoc and Sensor Systems (MASS 2011), Valencia, Spain, Oct. 17-22, 2011, in Proceedings of the 8th MASS, 2011, p. 192-201, 2011, http://hdl.handle.net/10722/158754.

"3rd Generation Partnership Project; Technical Specification Group Services and System Aspects; IP flow mobility and seamless Wireless Local Area Network (WLAN) offload; Stage 2 (Release 10)," 3GPP TS 23.261, V10.1.0, pp. 1-22, XP050442325, Sep. 2010.

International Search Report for PCT/IB2012/002868 dated May 7, 2013.

* cited by examiner

METHOD AND APPARATUS FOR DATA TRANSMISSION IN COMMUNICATION NETWORK

TECHNICAL FIELD

The present invention relates to a communication system, and more specifically, to a method and apparatus for data transmission in a communication network.

BACKGROUND

With continuing growth of traffic in a mobile communication network, how to enhance throughput of a cellular network has become an important problem. Methods, such as MIMO, beamforming, CoMP, and relay etc., have been employed to enhance throughput of the cellular network and to improve spectrum efficiency. However, these methods increase system complexity. Nowadays, a mobile phone usually has a dual-mode function, which not only can access to the cellular network, but also can use unlicensed frequency spectrum resources, such as Bluetooth network, WiFi network and the like. Thus, wireless network interfaces, such as a WiFi interface, in a mobile phone may be used to utilize the unlicensed frequency spectrum resources, such as WiFi resource, to enhance the throughput of the cellular network.

To this end, a solution of WiFi breakout offload introduces low cost WiFi technology into cellular communications, thereby introducing the unlicensed frequency spectrum resources into the cellular network to increase frequency spectrum resources in the cellular network, so as to alleviate the traffic pressure of a radio access network (RAN) of the cellular network. In this solution, a user equipment operates simultaneously in two wireless modes, i.e., WiFi and 3GPP, and the breakout is configured in the user equipment. The WiFi breakout offload solution comprises two solutions, i.e., seamless offload (as shown in FIG. 1) and seamed offload (as shown in FIG. 2). In the seamless offload solution, a WiFi access network is configured in the core network of operators; while in the seamed offload solution, the WiFi access network is separated from the core network of operators, and thereby the seamed offload solution does not support mobility. Both the seamless offload solution and the seamed offload solution remove traffic load from the whole wireless access network, including its air interface. In addition, a function unit for discovering and selecting the access network should be configured therein, to provide the user equipment with the discovering information and rules with regard to the manners to use the available access network.

However, in this solution, the WiFi access network does not closely coordinate with the 3GPP access network, which triggers a series of problems. For example, the WiFi access network and the 3GPP access network are two peer networks, and an operator needs to maintain and use both networks at the same time, and the cost is thereby increased. Meanwhile, new network nodes (such as the function unit for discovering and selecting the access network and a local proxy and the like) need to be added into the core network of the operator in this solution, and thereby the cost is further increased and the existing core network needs to be modified. In addition, the user equipment or core network determines whether to use traffic offload based on traffic properties and communication fees, and thereby removes traffic load from the whole wireless access network, which causes a decrease in the profit of operators. For example, an operator invests to maintain two networks, however, a great amount of traffic is bypassed to a low cost WiFi access network, and thereby the licensed frequency band is not utilized sufficiently. Meanwhile, this solution skips the whole wireless access network, thus, it cannot obtain information on physical (PHY) layer channels to make a decision for offloading. Therefore, in certain scenarios, this solution cannot provide an optimal solution for the minimum power consumption and maximum throughput of the user equipment, rendering worse flexibility. In addition, a complicated control mechanism is required in handover between two networks, which also affects user experience, and the quality of service QoS cannot be guaranteed when using the WiFi access network.

SUMMARY

Accordingly, defects of the method mentioned in the BACKGROUND lie in high complexity, high maintenance cost, and lack of the ability to provide in real time an optimized solution for handover offload and to guarantee the quality of service QoS, thereby affecting the user experience. Thus, it is a challenging problem to enhance the throughput of a cellular network while guaranteeing the user experience and the quality of service QoS.

To solve the above technical problem, the present invention provides a method for data transmission in a base station of a communication network with a user equipment dominated by the base station, wherein the communication network comprises a cellular network and an assistant wireless network dedicated to the cellular network; the assistant wireless network comprises at least one assistant wireless network access node; and the at least one assistant wireless network access node is connected to the base station via a wired or wireless link, wherein the method comprises the following steps: a. maintaining a first control channel in the cellular network between the base station and the user equipment, wherein the first control channel is used for exchanging with the user equipment control signalling of a data channel in the cellular network; b. exchanging control signalling of an emulation data channel with the user equipment; d. establishing the emulation data channel that connects the base station to the user equipment via the assistant wireless network and the wired or wireless link between the assistant wireless network access node and the base station; and e. at least receiving data from or sending data to the user equipment via the emulation data channel.

According to one embodiment of the invention, the following steps are further comprised before the step a: —receiving from the user equipment a request for registering with the assistant wireless network; —authenticating the user equipment; —after the user equipment is authenticated, executing the steps a-e.

According to one embodiment of the invention, the step b specifically comprises: exchanging the control signalling of the emulation data channel with the user equipment via the first control channel; or establishing a second control channel for exchanging with the user equipment the control signalling of the emulation data channel, wherein the second control channel connects the base station to the user equipment via the assistant wireless network and the wired or wireless link between the assistant wireless network access node and the base station.

According to one embodiment of the invention, step c is further comprised between the steps b and d: based on a first predetermined condition, selecting the data channel in the cellular network and/or the emulation data channel to receive data from or send data to the user equipment; and sending to the user equipment an instruction for indicating a selection result, wherein the first predetermined condition comprises at least one of the following items: —channel quality of the data channel in the cellular network and the emulation data channel; —load condition between the data channel in the cellular network and the emulation data channel; —a data type of a traffic; —quality of service of the traffic; or—power consumption of the user equipment.

According to one embodiment of the invention, the method also comprises the following step after the step e: f. when a second predetermined condition is met, releasing the emulation data channel and receiving data from or sending data to the user equipment via the data channel in the cellular network, wherein the second predetermined condition comprises at least one of the following items: —cellular network resources being sufficient; —the channel quality of the emulation data channel deteriorating; —the user equipment moving apart from the assistant wireless network access node; —the user equipment moving in a high speed; or—the user equipment having released the emulation data channel.

According to one embodiment of the invention, the control signalling of the emulation data channel comprises at least one of the following items: —registration management information of the assistant wireless network; —establishing and releasing information of the emulation data channel; —timing information of the emulation data channel; —traffic buffering information of the emulation data channel; —a data transmission format of the emulation data channel; or—identification information of a base station end and a user equipment end of the emulation data channel.

According to one embodiment of the invention, the assistant wireless network comprises any one of a WiFi network, a Zigbee network and a Bluetooth network or a combination thereof. As seen from the above, the application field and manners of the present invention are quite broad.

According to another aspect of the invention, the present invention provides a method for data transmission in a user equipment of a communication network with a base station dominating the user equipment, wherein the communication network comprises a cellular network and an assistant wireless network dedicated to the cellular network; the assistant wireless network comprises at least one assistant wireless network access node; and the at least one assistant wireless network access node is connected to the base station via a wired or wireless link, wherein the method comprises the following steps: A. maintaining a first control channel in the cellular network between the user equipment and the base station, wherein the first control channel is used for exchanging with the base station control signalling of a data channel in the cellular network; B. exchanging control signalling of an emulation data channel with the base station; D. establishing the emulation data channel that connects the user equipment to the base station via the assistant wireless network and the wired or wireless link between the assistant wireless network access node and the base station; and E. at least receiving data from the base station or sending data to the user equipment via the emulation data channel.

According to one embodiment of the invention, the following steps are further comprised before the step A: —sending to the base station a request for registering with the assistant wireless network; —accepting authentication of the base station; —after the user equipment being authenticated, executing the steps A-E.

According to one embodiment of the invention, the step B specifically comprises: exchanging the control signalling of the emulation data channel with the base station via the first control channel; or establishing a second control channel that is used for exchanging with the base station the control signalling of the emulation data channel, wherein the second control channel connects the user equipment to the base station via the assistant wireless network and the wired or wireless link between the assistant wireless network access node and the base station.

According to one embodiment of the invention, step C is further comprised between the steps B and D: receiving from the base station an instruction for instructing the user equipment to receive data from or send data to the base station via the data channel in the cellular network and/or via the emulation data channels, wherein when the instruction instructs the user equipment to receive data from or send data to the base station via the emulation data channel, the steps D and E are executed.

According to one embodiment of the invention, the method also comprises the following step after the step E: F. when a fourth predetermined condition is met, releasing the emulation data channel and receiving data from or sending data to the base station via the data channel in the cellular network, wherein the fourth predetermined condition comprises at least one of the following items: —channel quality of the emulation data channel deteriorating; —the user equipment moving apart from the assistant wireless network access node; —the user equipment moving in a high speed; or—the user equipment having released the emulation data channel.

According to one embodiment of the invention, the control signalling of the emulation data channel comprises at least one of the following items: —registration management information of the assistant wireless network; —establishing and releasing information of the emulation data channel; —timing information of the emulation data channel; —traffic buffering information of the emulation data channel; —a data transmission format of the emulation data channel; or—identification information of a base station end and a user equipment end of the emulation data channel.

According to a further aspect of the invention, the present invention provides an apparatus for data transmission in a base station of a communication network with a user equipment dominated by the base station, wherein the communication network comprises a cellular network and an assistant wireless network dedicated to the cellular network; the assistant wireless network comprises at least one assistant wireless network access node; and the at least one assistant wireless network access node is connected to the base station via a wired or wireless link, wherein the apparatus comprises: a first maintaining device, configured for maintaining a first control channel in the cellular network between the base station and the user equipment, wherein the first control channel is used for exchanging with the user equipment control signalling of a data channel in the cellular network; a first exchanging device, configured for exchanging control signalling of an emulation data channel with the user equipment; a first establishing device, configured for establishing the emulation data channel that connects the base station to the user equipment via the assistant wireless network and the wired or wireless link between the assistant wireless network access node and the base station; and a first transmitting device, configured for at least receiving data from or sending data to the user equipment via the emulation data channel.

According to yet another aspect of the invention, the present invention provides an apparatus for data transmission in a user equipment of a communication network with a base station dominating the user equipment, wherein the communication network comprises a cellular network and an assistant wireless network dedicated to the cellular network; the assistant wireless network comprises at least one assistant wireless network access node; and the at least one assistant wireless network access node is connected to the base station via a wired or wireless link, wherein the apparatus comprises: a second maintaining device, configured for maintaining a first control channel in the cellular network between the user equipment and the base station, wherein the first control channel is used for exchanging with the base station control signalling of a data channel in the cellular network; a second exchanging device, configured for exchanging control signalling of an emulation data channel with the base station; a second establishing device, configured for establishing the emulation data channel that connects the user equipment to the base station via the assistant wireless network and the wired or wireless link between the assistant wireless network access node and the base station; and a second transmitting device, configured for at least receiving data from the base station or sending data to the user equipment via the emulation data channel.

In the present invention, by maintaining the original control channels between the base station and the user equipment in the cellular network, such as synchronization channels, control channels for reference signals, control channels for HARQ and the like, the user equipment can also have the quality of service QoS in the cellular network when using the assistant wireless network to transmit data. Besides, handover operations are not needed when establishing or releasing the emulation data channels. Accordingly, complicated network control and management mechanisms for handover are not required, and thereby the user experience is further enhanced. For example, when the emulation data channels are released, the user equipment can go back directly to use the cellular network resources.

In addition, in this solution, the assistant wireless network is affiliated to the cellular network, and assists the cellular network to offload and transmit data. Through this solution, additional frequency spectrum resources in the assistant wireless network can be introduced for use by the user equipment in the cellular network, thereby expanding the resources in the cellular network. Accordingly, more resources can be released in the whole system, allowing operators to introduce more traffic, and meanwhile, user experience of other users in the cellular network can be enhanced. In addition, due to the relatively low cost of capital expenditures (CAPEX) and operational expenditures (OPEX) of the assistant wireless network, said solution is relatively simple to be implemented and low in cost.

Additionally, this solution is transparent for the core network. Its modification to a network is restricted within each cell and does not affect the core network. For example, when some cells need capacity to be increased, while others do not, this solution can merely be implemented on the ones having such requirement without upgrading the whole network. Accordingly, the solution is highly flexible in increasing throughput of the cellular network.

In addition, the registration and authentication of the user equipment may prevent the unauthorized user equipment in the cellular network, such as a laptop, from using the assistant network resources. In addition, the registration of the user equipment in the assistant wireless network and the subsequent authentication of the user equipment can establish a relation between the user equipment and the assistant wireless network used by it, thereby facilitating the operators to know the specific status of the user equipment, so that they can conduct subsequent operations and charging operations.

Additionally, transmitting the control signalling of the emulation data channel also occupies some resources, therefore, when the second control channel, used for exchanging with the user equipment the control signalling of the emulation data channel, is established, the traffic pressure at the air interface of the cellular network can be further alleviated by exchanging with the user equipment the signalling of the emulation data channel via the assistant wireless network.

By such solution, the base station can easily select and use the data channels in the cellular network and the emulation data channels based on status information of the cellular network and the assistant wireless network. For example, the base station can select the data channels in the cellular network for delay sensitive traffic and the emulation data channels for delay insensitive traffic. For example, when the data channels in the cellular network are overloaded or less satisfactory in channel quality, such as high packet loss rate, low SINR, and fail to meet the quality of service QoS requirements, the base station may select to establish the emulation data channels for data transmission. However, for example, when the cellular network recovers normal workload, the base station may re-select to transmit data via the data channels in the cellular network. Accordingly, the solution more flexibly guarantees the quality of service QoS, and enhances the utilization efficiency of resources.

BRIEF DESCRIPTION OF THE DRAWINGS

When reading the following detailed description of the non-limiting embodiments by referring to the drawings, other features, objects and advantages of the present invention will become more obvious, wherein.

In the drawings, identical or similar reference numbers throughout different views refer to identical or corresponding components or features.

DETAILED DESCRIPTION OF EMBODIMENTS

Figure 1:
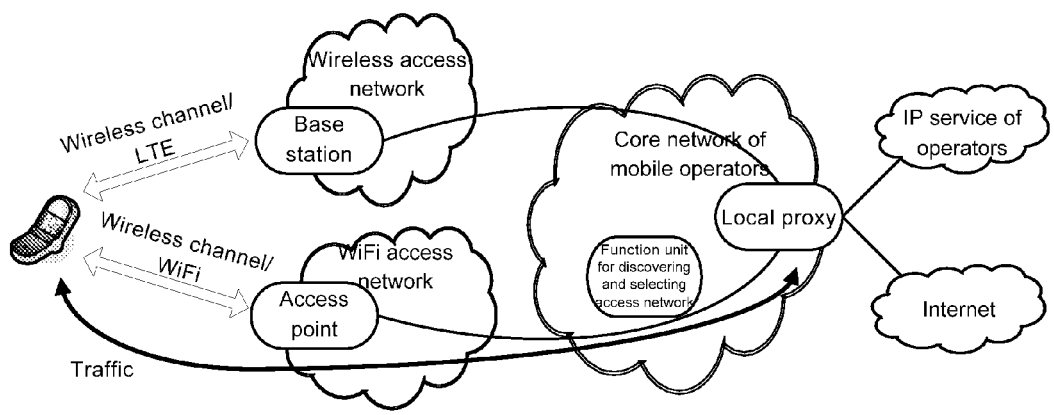
FIG. 1 illustrates a schematic diagram showing a seamless offload solution of the WiFi breakout offload solution in the prior art.
Figure 2:
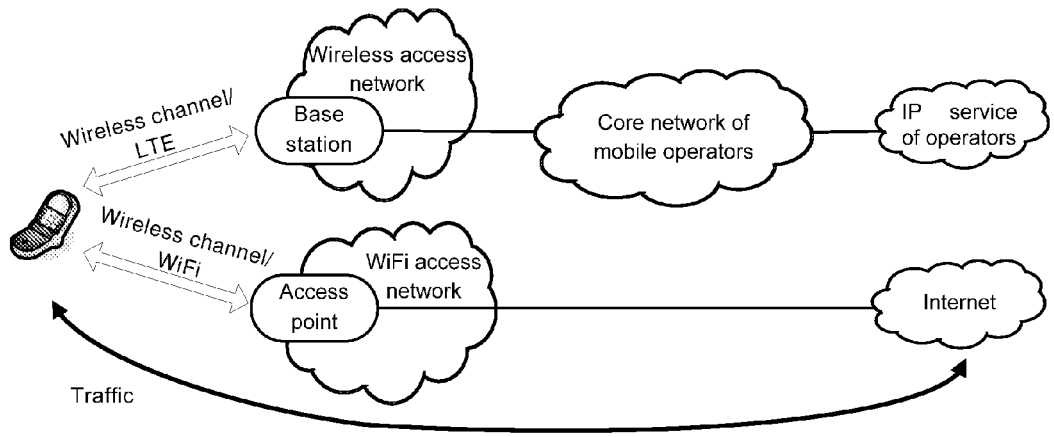
FIG. 2 illustrates a schematic diagram showing a seamed offload
Figure 3:
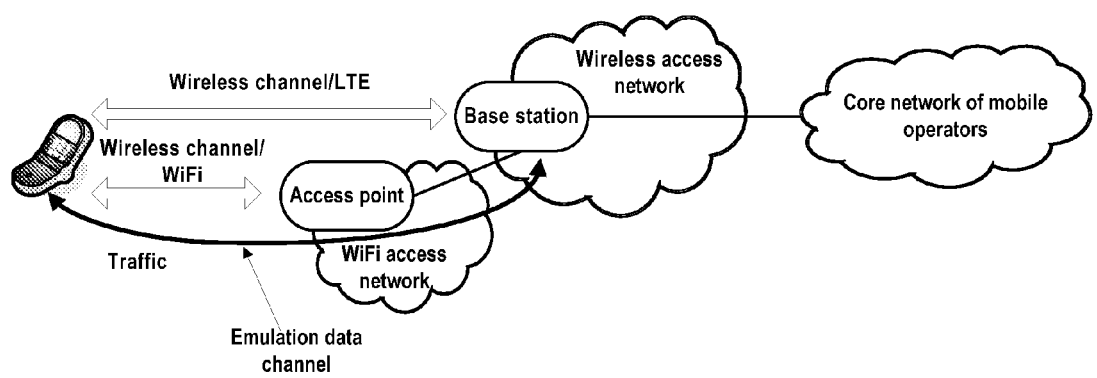
FIG. 3 illustrates a schematic diagram showing data transmission with emulation data channels according to one embodiment of the present invention.

FIG. 3 illustrates a schematic diagram showing data transmission with emulation data channels according to one embodiment of the present invention.

In the description, a WiFi network is employed as an example of the assistant network for illustration, however, those skilled in the art should appreciate that the assistant wireless network may comprise any one of the WiFi network, Zigbee network, Bluetooth network or a combination thereof. The user equipment in the description can be, for example, a mobile phone with the dual-mode function, by which a cellular network can be accessed. In addition, unlicensed frequency spectrum resources, such as the Bluetooth network and WiFi network, can be used via interfaces of that mobile phone. However, those skilled in the art should understand that other similar apparatuses are also applicable, such as a tablet computer, laptop and the like.

As indicated in the Figure, the offload solution for a cellular network according to the present invention is applied to solving the traffic pressure problem at the air interface of 3GPP, instead of at the wireless access network and core network. A base station manages and controls the WiFi network, and schedules and manages emulation data channels as it schedules and manages the 3GPP data channels (as indicated by black arrows). The WiFi network is a dedicated network for the base station, so that a WiFi access network can coordinate more closely with a 3GPP access network.

The base station can schedule traffic to any channel based on, for example, channel quality of data channels in the cellular network and the emulation data channels; load condition between the data channels in the cellular network and the emulation data channels; a data type of a traffic; quality of service of the traffic; or power consumption of the user equipment. For example, when the workload of the cellular network is low, the base station can schedule all traffic to the 3GPP network, and close all WiFi access points to reduce power consumption. However, when the workload of the cellular network is high or the channel quality is poor, the base station can schedule relevant traffic to the WiFi network, so as to benefit the resources in the WiFi network and alleviate pressure on the cellular network. The solution is transparent to the core network. Its modification to networks is restricted within each cell and does not affect the core network.

Figure 4:
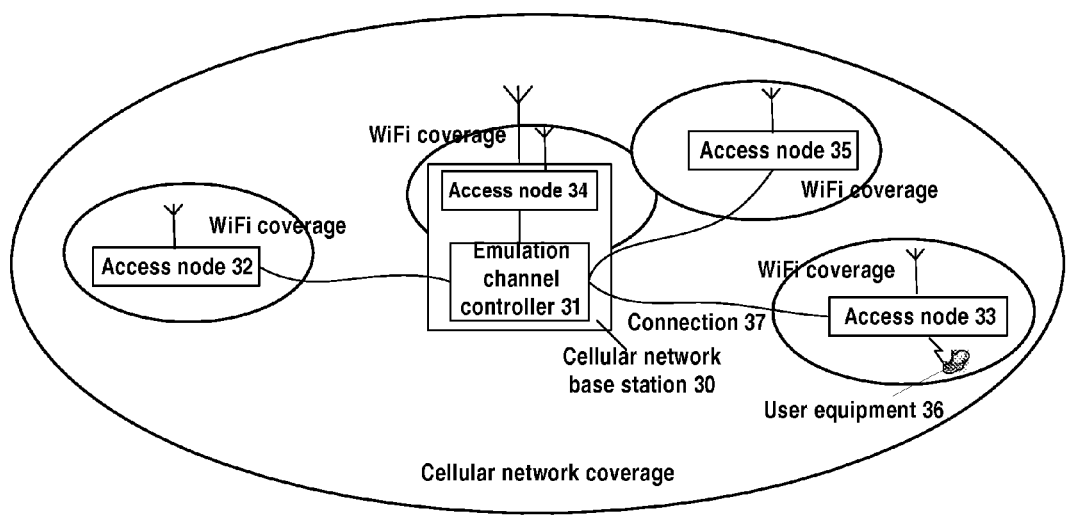
FIG. 4 illustrates a schematic diagram showing the structure of a cellular network having an assistant wireless network access node according to one embodiment of the present invention.

FIG. 4 illustrates a schematic diagram of the structure of a cellular network having an assistant wireless network access node according to one embodiment of the present invention.

As indicated in the Figure, a cellular network base station 30 has an emulation channel controller 31, and has four WiFi access nodes, 32, 33, 34 and 35, within the domain under the control of the cellular network base station 30. The access nodes 32, 33, 34 and 35 can be integrated in the base station, and can also be disposed in other areas of the cellular network, such as areas with high traffic amount, or areas having more user equipments and the like. These nodes 32, 33, 34 and 35 are connected to the cellular network base station 30 via wired links, such as fiber or cable. Alternatively, those skilled in the art should understand that these nodes can also be connected to the cellular network base station 30 via wireless links, such as wireless mesh. These WiFi access nodes 32, 33, 34 and 35 respectively form respective WiFi coverage, and thereby respectively constitute the assistant wireless network dedicated to the cellular network.

Although FIG. 3 illustrates four WiFi access nodes, those skilled in the art should understand that the number and disposed positions of access nodes can be adjusted arbitrarily according to actual needs.

For example, when a user equipment 36 having a wireless network interface is close to the WiFi network access node 33, the user equipment 36 may communicate data with the base station 30 using WiFi network resources, and thereby establish an emulation data channel with the cellular network base station 30 via a connection 37 between the WiFi network and the WiFi network access node 33 with the base station 30. An emulation channel controller 31 in the cellular network base station 30 controls and manages the emulation data channels, and functions as a bridge between the cellular network and the assistant wireless networks dedicated thereto, such as the WiFi network. Similarly, the user equipment 36 also possesses a corresponding controller, which functions as the bridge between the cellular network and the assistant wireless networks dedicated thereto, such as the WiFi network. The controller may be implemented by, for example, installing a software in the user equipment. Similarly, when the user equipment is close to other WiFi network access nodes, similar operations may also be executed to communicate data with the base station 30.

From the perspective of the cellular network, the emulation data channels almost have identical features and functions with the data channels in the cellular network (such as PDSCH or PUSCH), however, the emulation data channels do not consume the limited frequency spectrum resources in the cellular network. Data units in PSCH or PUSCH are transmitted in the emulation data channels transparently, in contrast, when the emulation data channels are used to transmit data, all control channels in the cellular network, such as synchronization channels, control channels for reference signals, control channels for HARQ and the like, are maintained and kept functioning in licensed frequency bands. Thus, handover operations during establishing or releasing of the emulation data channels are avoided and the user experience is improved.

Figure 5:
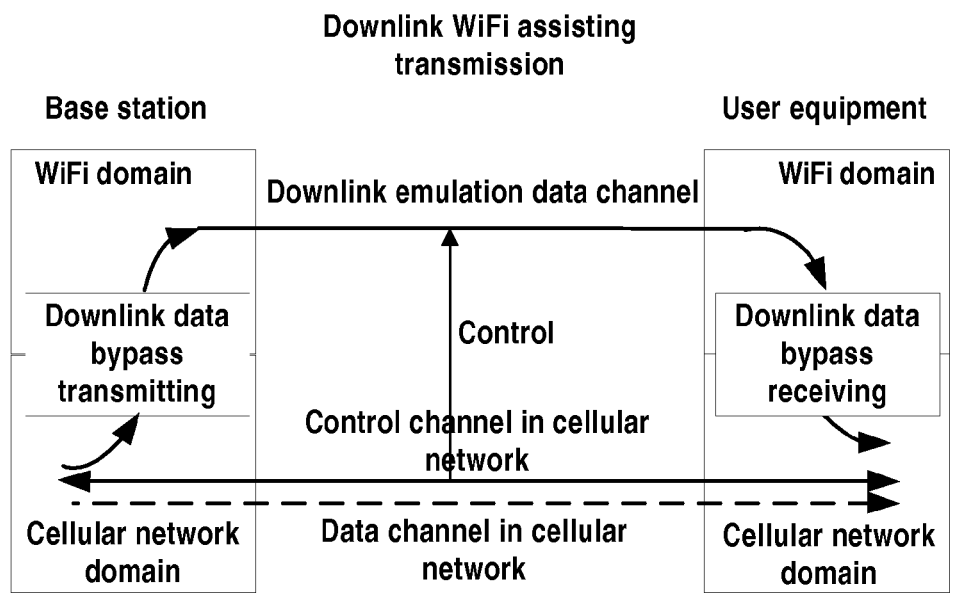
FIG. 5 illustrates a schematic diagram showing downlink assistant transmission by bypassing the data in data channels of a cellular network to a user equipment via downlink emulation data channels according to one embodiment of the present invention.

FIG. 5 illustrates a schematic diagram showing downlink assistant transmission by bypassing the data in data channels of a cellular network to a user equipment via downlink emulation data channels according to one embodiment of the present invention.

As indicated in FIG. 5, the block on left side illustrates a schematic diagram of data sending on the base station side. The block is composed of a WiFi domain and a cellular network domain, while the block on right side illustrates a schematic diagram of data receiving on the user equipment side, which is also composed of a WiFi domain and a cellular network When a downlink emulation data channel is employed by the base station to send data to the user equipment, the data originally sent via the data channel in the cellular network (as indicated by a dotted line) on the base station side will be bypassed to the downlink emulation data channel, and thereby sent to the user equipment, while the user equipment also receives data via the downlink emulation data channel, and thereby the originally occupied resources in the cellular network domain are released and the traffic pressure at the air interface is alleviated. During this process, control channels in the cellular network, such as synchronization channels, control channels for reference signals, control channels for HARQ and the like, are not bypassed into the WiFi network, but still maintained in the cellular network. In another aspect, control signalling for the downlink emulation data channel, such as registration management information of the assistant wireless network, establishing and releasing information of the emulation data channel, timing information of the emulation data channel, traffic buffering information of the emulation data channels, a data transmission format of the emulation data channel, and identification information (such as destination address information, MAC address information, source address information, etc.) and scheduling command information (such as size of the transmitted data, time slot, format and coding for transmission, etc.) of the base station end and user equipment end of the emulation data channel, and the like are transmitted via the control channels in the cellular network. Therefore, the control channels in the cellular network always exist during the whole process. Accordingly, handover process is not required during the establishing of the downlink emulation data channel. When the downlink emulation data channel is used, quality of service QoS is guaranteed since the downlink emulation data channel is endowed with the control channels in the original cellular network. In another aspect, the core network cannot sense the existence of the downlink emulation data channel.

Figure 6:
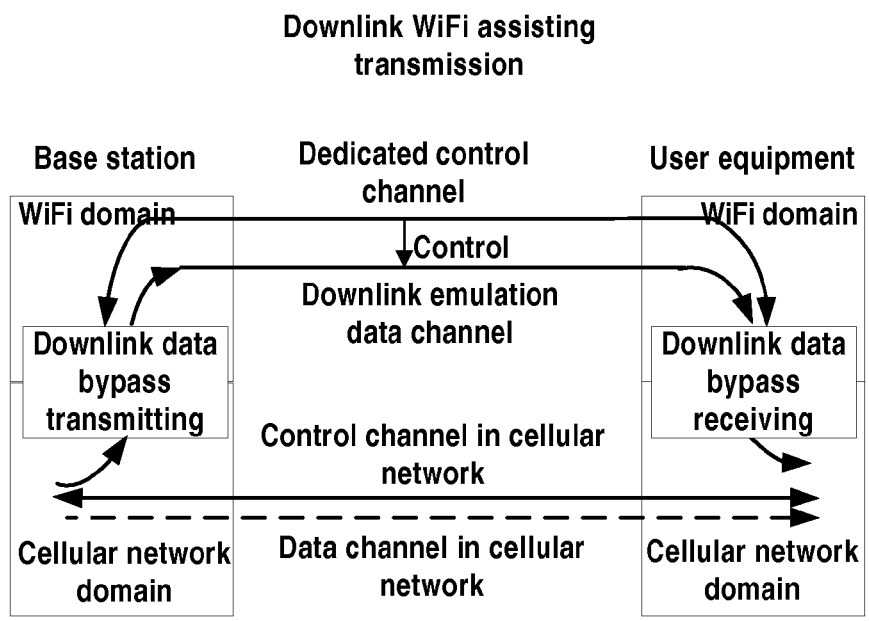
FIG. 6 illustrates a schematic diagram showing downlink assistant transmission by bypassing the data in data channels of a cellular network to a user equipment via downlink emulation data channels according to another embodiment of the present invention.

FIG. 6 illustrates a schematic diagram showing downlink assistant transmission by bypassing the data in data channels of a cellular network to a user equipment via downlink emulation data channels according to another embodiment of the present invention.

As indicated in FIG. 6, the block on left side illustrates a schematic diagram of data sending on the base station side. The block is composed of a WiFi domain and a cellular network domain, while the block on right side illustrates a schematic diagram of data receiving on the user equipment side, which is also composed of a WiFi domain and a cellular network domain.

Similar to the description in FIG. 5, when a downlink emulation data channel is employed by the base station to send data to the user equipment, the data originally sent via the data channel in the cellular network (as indicated by a dotted line) on the base station side will be bypassed to the downlink emulation data channel, and thereby sent to the user equipment, while the user equipment also receives data via the downlink emulation data channel, and thereby the originally occupied resources in the cellular network domain are released and the traffic pressure at the air interface is alleviated. During this process, control channels in the cellular network, such as synchronization channels, control channels for reference signals, control channels for HARQ and the like, are not bypassed into the WiFi network, but still maintained in the cellular network.

What is different from FIG. 5, however, lies in that as shown in FIG. 6, a dedicated control channel (i.e., a second control channel) is established for the downlink emulation data channel in the WiFi domain, which is used for exchanging with the user equipment the control signalling of the downlink emulation data channel, such as registration management information of the assistant wireless network, establishing and releasing information of the emulation data channel, timing information of the emulation data channel, traffic buffering information of the emulation data channel, a data transmission format of the emulation data channel, and identification information (such as destination address information, MAC address information, source address information, etc.) and scheduling command information (such as size of the transmitted data, time slot, format and coding for transmission, etc.) of the base station end and user equipment end of the emulation data channel, and the like. Similar to the downlink emulation data channel, the dedicated control channel also connects the base station to the user equipment via the assistant wireless network and the wired or wireless link between the assistant wireless network access node and the base station (as shown in FIG. 4). Transmitting the control signalling of an emulation data channel also occupies some resources, therefore, when the dedicated control channel is established for the emulation data channel, the traffic pressure at the air interface of the cellular network can be further alleviated by exchanging with the user equipment the signalling of the emulation data channel via the assistant wireless network.

Figure 7:
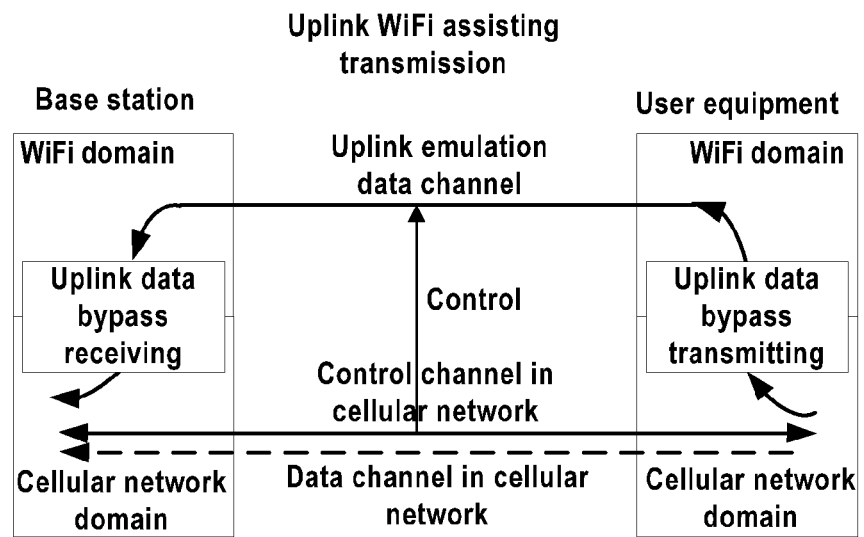
FIG. 7 illustrates a schematic diagram showing uplink assistant transmission by bypassing the data in data channels of a cellular network to a base station via uplink emulation data channels according to one embodiment of the present invention.

FIG. 7 illustrates a schematic diagram showing uplink assistant transmission by bypassing the data in data channels of a cellular network to a base station via uplink emulation data channels according to one embodiment of the present invention.

As indicated in FIG. 7, the block on left side illustrates a schematic diagram of data receiving on the base station side. The block is composed of a WiFi domain and a cellular network domain, while the block on right side illustrates a schematic diagram of data sending on the user equipment side, which is also composed of a WiFi domain and a cellular network domain.

When an uplink emulation data channel is employed by the base station to receive data from the user equipment, the data originally sent via the data channel in the cellular network (as indicated by a dotted line) on the user equipment side will be bypassed to the uplink emulation data channel, and thereby sent to the base station, while the base station also receives data via the uplink emulation data channel, and thereby the originally occupied resources in the cellular network domain are released and the traffic pressure at the air interface is alleviated. During such process, control channels in the cellular network, such as synchronization channels, control channels for reference signals, control channels for HARQ and the like, are not bypassed into the WiFi network, but still maintained in the cellular network. In another aspect, control signalling for the uplink emulation data channel, such as registration management information of the assistant wireless network, establishing and releasing information of the emulation data channel, timing information of the emulation data channel, traffic buffering information of the emulation data channel, a data transmission format of the emulation data channel, and identification information (such as destination address information, MAC address information, source address information, etc.) and scheduling command information (such as size of the transmitted data, time slot, format and coding for transmission, etc.) of the base station end and user equipment end of the emulation data channel, and the like are transmitted via the control channels in the cellular network. Therefore, the control channels in the cellular network always exist during the whole process. Accordingly, handover process is not required during the establishing of the uplink emulation data channel. When the uplink emulation data channel is used, quality of service QoS is guaranteed since the uplink emulation data channel is endowed with the control channels in the original cellular network. In another aspect, the core network cannot sense the existence of the uplink emulation data channel.

Figure 8:
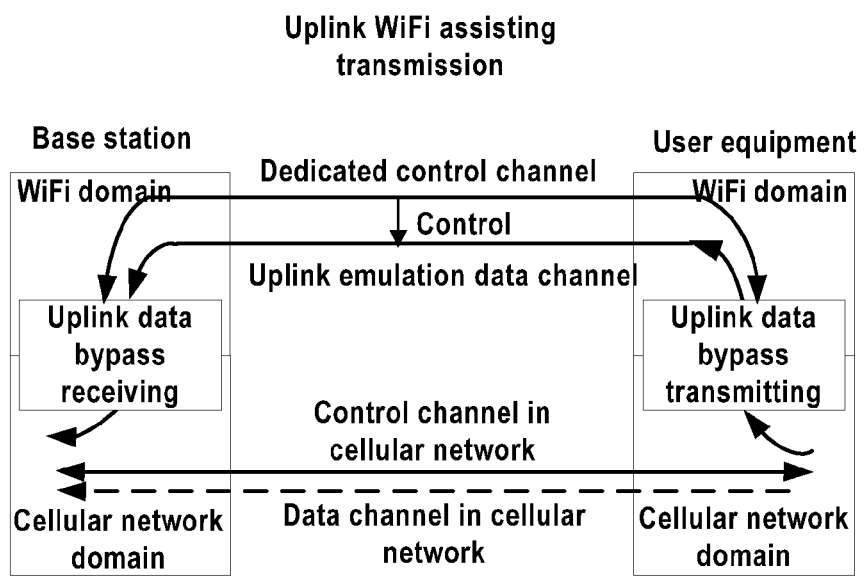
FIG. 8 illustrates a schematic diagram showing uplink assistant transmission by bypassing the data in data channels of a cellular network to a base station via uplink emulation data channels according to another embodiment of the present invention.

FIG. 8 illustrates a schematic diagram showing uplink assistant transmission by bypassing the data in data channels of a cellular network to a base station via uplink emulation data channels according to another embodiment of the present invention.

As indicated in FIG. 8, the block on left side illustrates a schematic diagram of data receiving on the base station side. The block is composed of a WiFi domain and a cellular network domain, while the block on right side illustrates a schematic diagram of data sending on the user equipment side, which is also composed of a WiFi domain and a cellular network domain.

Similar to the description of FIG. 7, when the uplink emulation data channel is employed by the base station to receive data from the user equipment, the data originally sent via the data channel in the cellular network (as indicated by a dotted line) on the user equipment side will be bypassed to the uplink emulation data channel, and thereby sent to the base station, while the base station also receives data via the uplink emulation data channel, and thereby the originally occupied resources in the cellular network domain are released and the traffic pressure at the air interface is alleviated. During such process, control channels in the cellular network, such as synchronization channels, control channels for reference signals, control channels for HARQ and the like, are not bypassed into the WiFi network, but maintained in the cellular network.

What is different from FIG. 7, however, lies in that as shown in FIG. 8, a dedicated control channel (i.e., a second control channel) is established for the uplink emulation data channel in the WiFi domain, which is used for exchanging with the user equipment control signalling of the uplink emulation data channel, such as registration management information of the assistant wireless network, establishing and releasing information of the emulation data channel, timing information of the emulation data channel, traffic buffering information of the emulation data channel, a data transmission format of the emulation data channel, and identification information (such as destination address information, MAC address information, source address information, etc.) and scheduling command information (such as size of the transmitted data, time slot, format and coding for transmission, etc.) of the base station end and user equipment end of the emulation data channel, and the like. Similar to the uplink emulation data channel, the dedicated control channel also connects the base station to the user equipment via the assistant wireless network and the wired or wireless link between the assistant wireless network access node and the base station (as shown in FIG. 4). Transmitting control signalling of an emulation data channel also occupies some resources, therefore, when the dedicated control channel is established for the emulation data channel, the traffic pressure at the air interface of the cellular network can be further alleviated by exchanging with the user equipment the signalling of the emulation data channel via the assistant wireless network.

Figure 9:
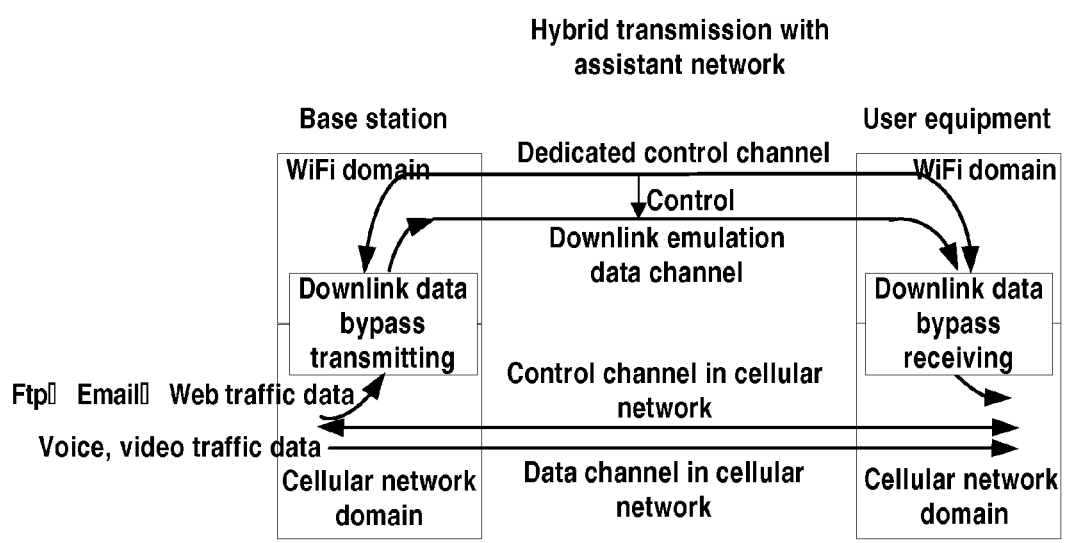
FIG. 9 illustrates a schematic diagram showing hybrid transmission by using downlink emulation data channels and data channels of a cellular network according to yet another embodiment of the present invention.

FIG. 9 illustrates a schematic diagram showing hybrid transmission by using downlink emulation data channels and data channels in a cellular network according to yet another embodiment of the present invention.

As indicated in FIG. 9, the block on left side illustrates a schematic diagram of data sending on the base station side. The block is composed of a WiFi domain and a cellular network domain, while the block on right side illustrates a schematic diagram of data receiving on the user equipment side, which is also composed of a WiFi domain and a cellular network domain. In addition, in the embodiment, a dedicated control channel is configured in the WiFi domain to control the downlink emulation data channel.

The base station can select whether to send data to the user equipment via the downlink emulation data channel or to send data to the user equipment via the data channel in the cellular network, based on the traffic data type. For example, the delay insensitive traffic data, such as Ftp, Email or Web etc., can be transmitted to the user equipment via the downlink emulation data channel, while the delay sensitive traffic data, such as audio and video traffics etc., can be transmitted to the user equipment via the data channel in the cellular network. Thus, the quality of service QoS of different traffic data is guaranteed, and the flexibility of the solution is also increased.

In addition, various portions and the data transmission process not described or not described in detail in FIG. 9 are consistent with the features of the same or similar portions and the data transmission process correspondingly described in FIG. 6, which will not be detailed herein.

Those skilled in the art should understand that if the dedicated control channel used for the downlink emulation data channel is not configured, the hybrid transmission mode is still feasible. In addition, when the uplink emulation data channel and the data channel in the cellular network are used for hybrid transmission, the process is similar to the hybrid transmission by using the downlink emulation data channel and the data channel in the cellular network, thus, it will not be detailed herein.

Figure 10:
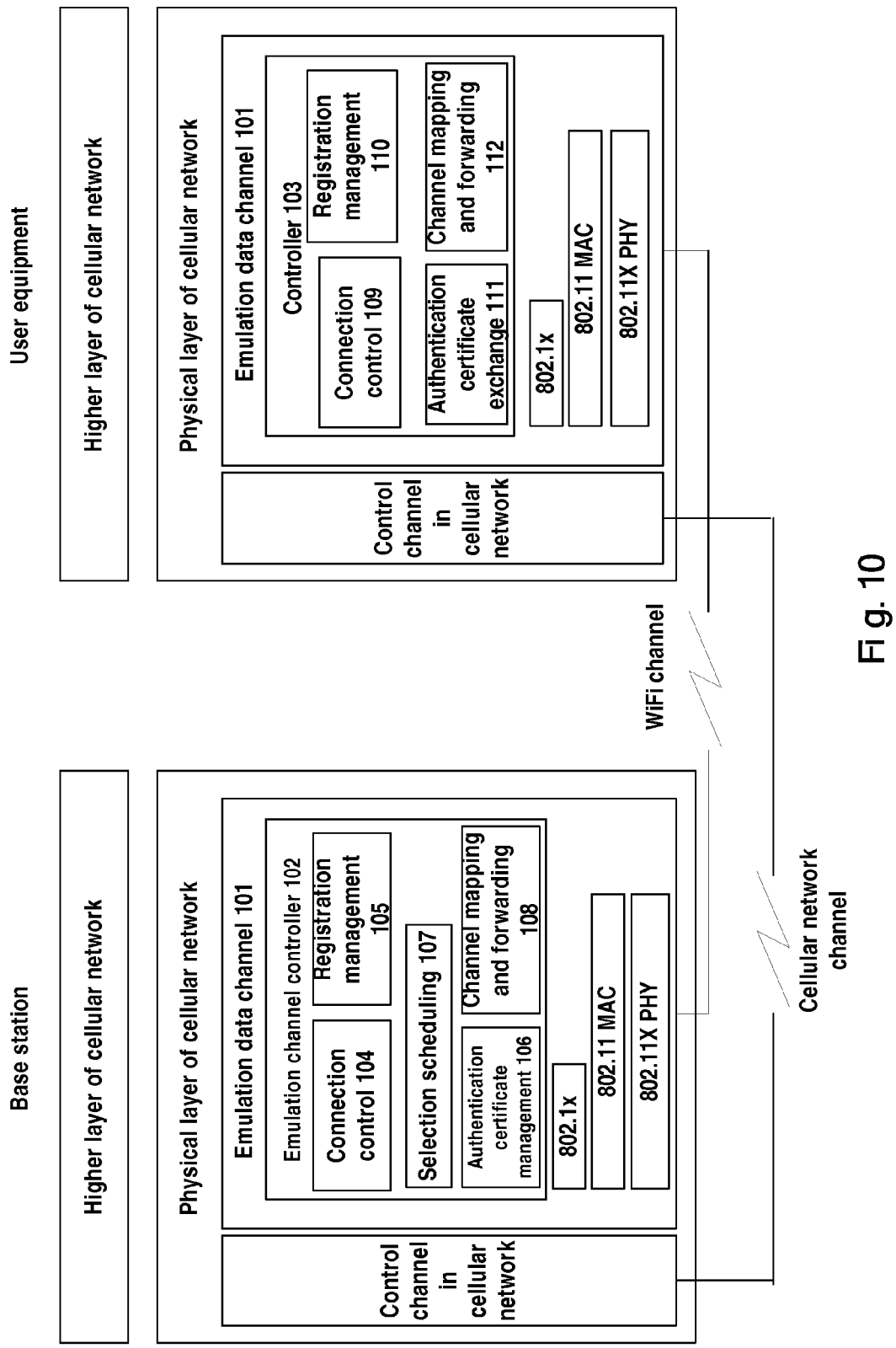
FIG. 10 illustrates a block diagram showing functions of both base station side and user equipment side according to one embodiment of the present invention.

FIG. 10 illustrates a block diagram of functions on both the base station side and user equipment side according to one embodiment of the present invention.

The left side of FIG. 10 illustrates a function block diagram on the base station side and the right side of FIG. 10 illustrates a function block diagram on the user equipment side.

In the embodiment, an emulation data channel 101 is constructed on the physical layer. From the base station or user terminal's point of view, the user equipment accesses the network via the cellular network, however, from the point of view of the physical layer of the base station or user terminal, the user equipment accesses the network via the WiFi network. As shown in the figure, the base station has an emulation channel controller 102, while the user equipment also has a peer controller 103, which implements similar functions corresponding to those implemented by the emulation channel controller 102 in the base station. In addition, the emulation channel controller 102 in the base station and the controller 103 in the user equipment hide a specific mechanism in the physical layer to higher layers, such as the data link layer, for example, the user equipment accessing the network via WiFi.

In another aspect, as shown in the figure, the control channels in the cellular network are still established between the base station and the user equipment via the cellular network, which allows the user equipment to have the quality of service QoS of the cellular network when using the WiFi network for data transmission, and the handover operation is not required during the establishing or releasing of the emulation data channel 101.

As indicated in the left side of FIG. 10, the emulation channel controller 102 in the base station comprises the following modules: connection control 104, registration management 105, authentication certificate management 106, selection scheduling 107, and channel mapping and forwarding 108. The controller 103 in the user equipment comprises connection control 109, registration management 110, authentication certificate exchange 111, and channel mapping and forwarding 112.

Wherein on the base station side, the connection control 104 in the emulation channel controller 102 is used for establishing or releasing the emulation data channels with the user equipment. Similarly, on the user equipment side, the connection control 109 in the controller 103 is used for establishing or releasing the emulation data channels with the base station.

The registration management 105 in the base station coordinates with the registration management 110 in the user equipment to accomplish the registration of the user equipment with the WiFi network. For example, the user equipment can register by its identification information such as telephone number or Radio Network Temporary Identity (RNTI), whereas the registration The authentication certificate management 106 on the base station side coordinates with the authentication certificate exchange 111 on the user equipment side to accomplish the authentication of the user equipment, so as to allow it to use WiFi network resources. For the authentication of the WiFi network dedicated to the cellular network, the original authenticating manner in the cellular network domain is still used, and thereby no new authentication certificate is to be introduced, which can be accomplished by the authentication certificate exchange 111 on the user equipment side.

For example, on the base station side, the authentication certificate can be obtained from the core network, whereas on the user equipment side, the authentication certificate can be obtained from a SIM card. A connection can be established between the user equipment and the WiFi network used thereby through the registration and authentication of the user equipment, thereby facilitating operators to calculate the traffic amount and obtain real time data. The 802.1x protocol in the wireless network domain can still be used as the authentication protocol for the wireless network.

The selection scheduling 107 on the base station side is in charge of overall arrangements on data scheduling and the use of data channels in the cellular network and the emulation data channels. For example, the selection scheduling 107 can select the data channels in the cellular network for delay sensitive traffic and the emulation data channels for the delay insensitive traffic. Similarly, the selection scheduling 107 may select whether to use the data channels in the cellular network or the emulation data channels based on channel quality, load balance between the cellular network and the WiFi network, power consumption of the user equipment and the like.

The channel mapping and forwarding 108 on the base station side coordinates with the channel mapping and forwarding 112 on the user equipment side to establish data links. The mapping relationship between the MAC address in the WiFi domain and RNTI in the cellular network domain can be established by using the channel mapping and forwarding 108 on the base station side and the channel mapping and forwarding 112 on the user equipment side. With this mapping relationship, the base station may know how to send data in the cellular network to a correct user equipment via correct emulation data channels, and the user equipment may know how to send data in the cellular network to the base station via correct emulation data channels. For example, as to downlink transmission, on the base station side, when emulation data channels are used to send data to the user equipment, for different traffics directed to the same user equipment (such as Ftp, Web and the like), different data channels in the cellular network used by these traffics (i.e., LTE data channel) should correspond one by one to the emulation data channels. Then, based on such correspondence, the data transmitted originally in the data channels in the cellular network is forwarded to the corresponding emulation data channels, and sent to the user equipment via correct emulation data channels, which can be implemented by the channel mapping and forwarding 108. In addition, the WiFi resources are used simultaneously by a plurality of user equipments, that is, the emulation data channels are used to communicate data with the base station, thus, the mapping relationship established by the channel mapping and forwarding 108 can also determine for different user equipments the correct emulation data channels corresponding to the original LTE data channels, and thereby the correctness of data transmission can be guaranteed. However, on the user equipment side, when the emulation data channels are used to receive data from the base station, since the user equipment can have different traffics (such as Ftp, Web and the like) at the same time, and thereby have multiple data channels in the cellular network, the channel mapping and forwarding 112 on the user equipment side can be employed to determine the correspondence between the emulation data channels and these multiple data channels in the cellular network, and to correctly forward, based on the correspondence, the data received from the base station via the emulation data channels to corresponding correct data channels in the cellular network, thus, the data receiving is completed. As to the uplink transmission, the channel mapping and forwarding 108 on the base station side and the channel mapping and forwarding 112 on the user equipment side execute an inverse process similar to the uplink transmission, which will not be detailed herein.

As seen from FIG. 10, data transmission implemented via the emulation data channel 101 in the WiFi domain can still use 802.11MAC and 802.11x PHY protocols.

Figure 11:
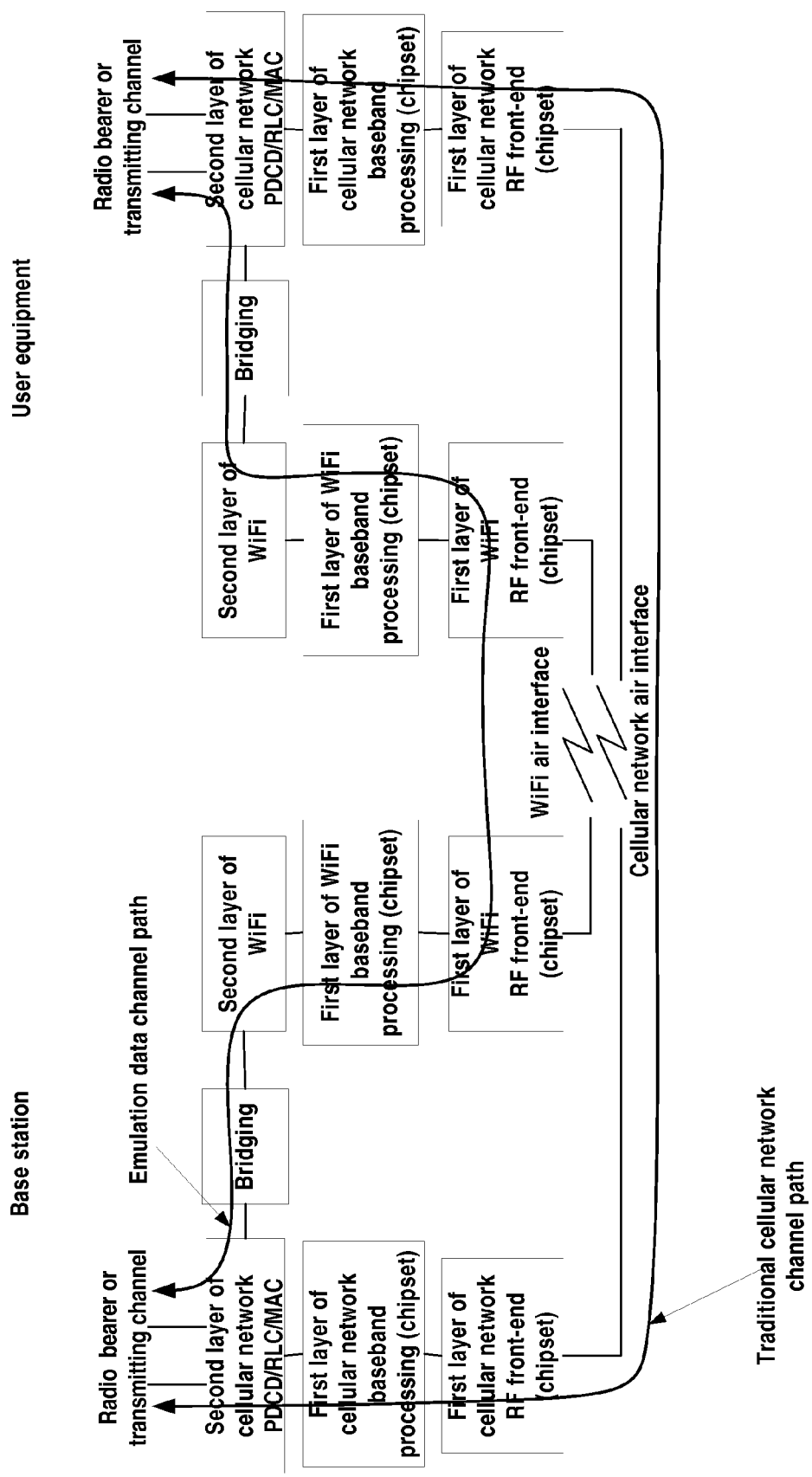
FIG. 11 illustrates a schematic diagram showing the path of an emulation data channel according to another embodiment of the present invention.

FIG. 11 illustrates a schematic diagram showing the path of an emulation data channel according to another embodiment of the present invention. As shown in the Figure, FIG. 11 illustrates a schematic diagram showing protocol stacks on both the base station side and the user equipment side, wherein the dotted line illustrates the path of the original data channel in the cellular network, and the solid line illustrates the path of the emulation data channel.

In some previous embodiments, the emulation data channels are established on the physical layer. However, according to this embodiment of the present invention, the application scope of the present invention can be extended to the second layer (data link layer (PDCP sublayer, RLC sublayer and MAC sublayer)), that is, the emulation data channels can be established on the second layer. The LTE protocols define a plurality of end-to-end channels in the second layer, such as radio bearer, logic channel, transmission channel and the like. Thus, the emulation data channels can be used to emulate these channels, and the data and/or control signalling in the second layer can be bypassed to the emulation data channels to alleviate the load thereof.

For example, as shown in the Figure, the emulation data channels can be configured in the second layer by bridging the second layer of WiFi and the second layer of the cellular network, and the bridging can be implemented by a software, and functions as a bridge between the cellular network domain and the WiFi domain, to implement the emulation data channels.

Preferably, the emulation data channels can operate in the MAC sublayer, to emulate the transmission channels. Alternatively, the emulation data channels can operate in the PDCP sublayer, to emulate the radio bearers.

The process and means for data transmission between the base station and the user equipment using the emulation data channels in the MAC and PDCP sublayers are similar to those for data transmission using the emulation data channels in the physical layer as stated above, which will not be detailed herein. In addition, those skilled in the art should understand that by the above similar manners, dedicated control channels can also be established between the second layer of WiFi and the second layer of the cellular network to control the emulation data channels.

Expanding the emulation data channels to the second layer can avoid changing the chipset, and the application field of the present invention is thus expanded.

Figure 12:
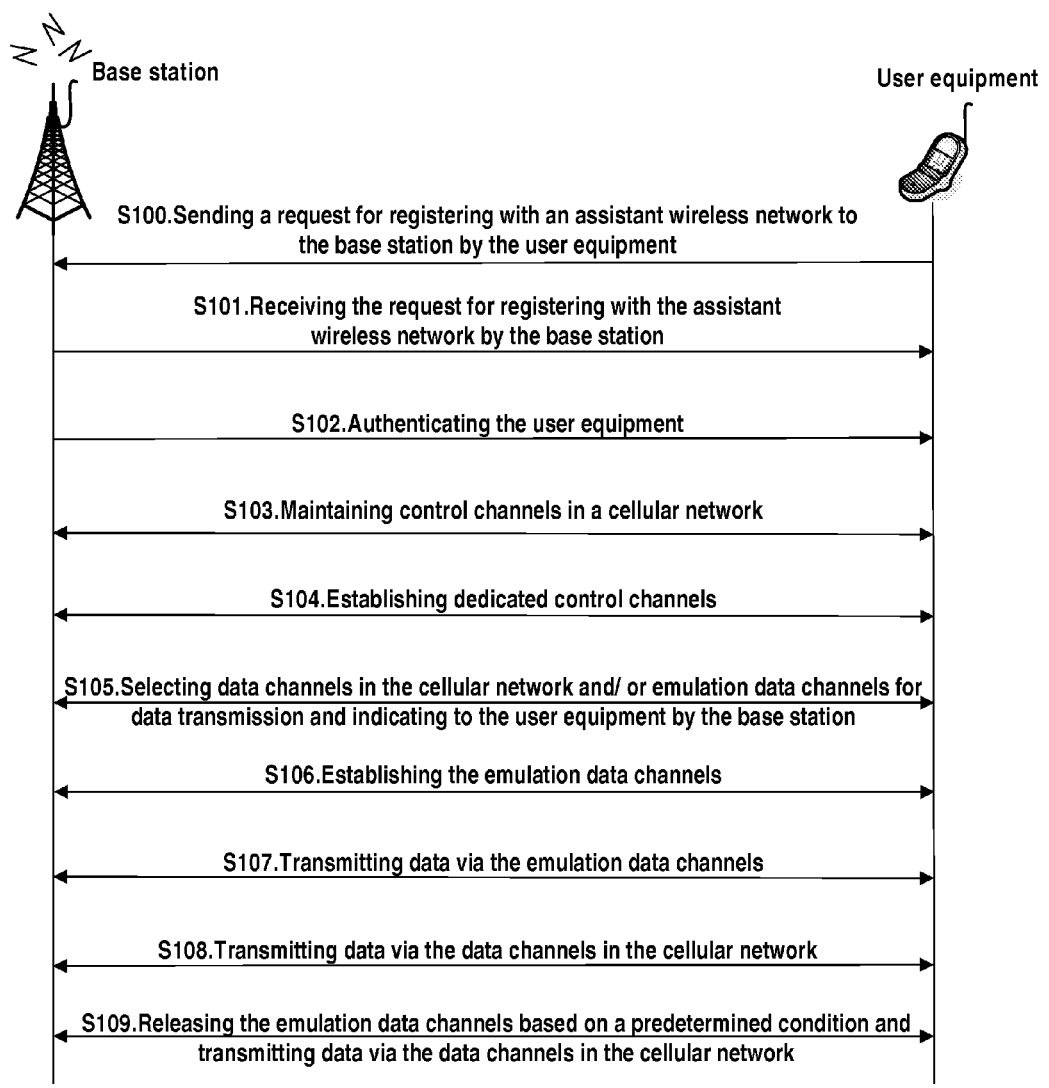
FIG. 12 illustrates a flow chart of a system method according to one embodiment of the present invention.

FIG. 12 illustrates a flow chart of the system method according to one embodiment of the present invention.

As indicated in the Figure, in step S100, when the user equipment located near the assistant wireless network access node needs to use the assistant wireless network, such as the WiFi network, to communicate data with the base station, it sends to the base station a request for registering with the assistant wireless network, for example, the request may comprise identification information such as its mobile phone number, RNTI and the like.

In step S101, the base station receives a request for registering with the assistant wireless network from the user equipment, and decides whether to accept the request or not. In step S102, the base station authenticates the user equipment so as to determine whether it is authorized to use the assistant wireless network resources, such as whether it can use a key authentication certificate and the like.

When the user equipment is authenticated by the based station, it can use resources of the assistant wireless network. Those skilled in the art should understand that in some alternative embodiments, for example, when the base station initiates using the assistant wireless network to communicate data with the user equipment, steps S100-S102 can be skipped. When authentication or registration is not required, such as when a free assistant wireless network is provided, steps S100-S102 can also be skipped.

In step S103, the control channels in the cellular network between the base station and the user equipment, such as synchronization channels, control channels for reference signal, control channels for HARQ and the like, are maintained to enable the user equipment to have the quality of service QoS in the cellular network when using the assistant wireless network to transmit data, and to spare the user equipment from the handover operations in establishing or releasing of the emulation data channels, and thereby complicated network control and management mechanisms used for handover are not needed and user experience is further enhanced.

In step S104, dedicated control channels are established for the emulation data channels, to exchange with the user equipment control signalling of the emulation data channels, such as registration management information of the assistant wireless network, establishing and releasing information of the emulation data channels, timing information of the emulation data channels, traffic buffering information of the emulation data channels, data transmission is formats of the emulation data channels, and identification information (such as destination address information, MAC address information, source address information, etc.) and scheduling command information (such as size of the transmitted data, time slot, format and coding for transmission, etc.) of the base station end and user equipment end of the emulation data channels, and the like.

However, when the original control channels in the cellular network are employed to transmit the above control signalling, step S104 can be skipped.

In step S105, based on real time conditions such as the channel quality of the data channels in the cellular network and the emulation data channels, the load condition between the data channels in the cellular network and the emulation data channels, the data type of a traffic, the quality of service of the traffic, or power consumption of the user equipment, etc., the base station decides whether to transmit data via the emulation data channels, or whether to transmit specific traffic data via the emulation data channels, or whether to conduct the hybrid transmission illustrated in FIG. 9 and the like, and sends to the user equipment an instruction indicating the selection result of the base station, and the user equipment conducts corresponding subsequent operations based on the instruction.

When the base station decides to transmit data via the emulation data channels, step S106 is executed, which is to establish the emulation data channels between the base station and the user equipment.

In step S107, the base station communicates data with the user equipment via the emulation data channels.

However, when the base station decides not to use the emulation data channels for data transmission, steps S106 and S107 are skipped, and merely step S108 is executed, that is, transmitting data via the data channels in the cellular network.

When the base station decides to use the emulation data channels for data transmission, it will monitor various predetermined conditions in real time, for example, whether the cellular network resources are sufficient, whether the channel quality of the emulation data channels deteriorates, whether the user equipment is moving apart from the assistant wireless network access node, whether the user equipment is moving in a high speed, or whether the user equipment has released the emulation data channels and the like. When one or more of the above conditions are met, the base station releases the emulation data channels and transmits data via the data channels in the cellular network. Thus, the service quality QoS of the transmission of various traffic data can be guaranteed.

In addition, by reading the flow chart and the present description, those skilled in the art should understand that certain steps in the flow chart may be conducted in a reversing order or at the same time. For example, steps S103 and S104 can be conducted at the same time.

Those skilled in the art should understand that the above embodiments are all exemplary, but not limiting. Different technical features in different embodiments can be combined, so as to achieve a beneficial effect. By studying the drawings, the present description, and the claims, those skilled in the art may understand and implement other modifications of the disclosed embodiments. In the claims, the term "comprising", "including", or "containing" does not exclude other apparatuses or steps; the indefinite article "a", "an" or "the" does not exclude a plural concept, and the terms "the first" and "the second" are used for identifying names but not for representing any specific order. Any reference numbers should not be understood as the limiting to the protection scope. The function achieved by multiple portions in the claims can be achieved by a single separate portion. Some technical features are recited in different dependent claims, which does not mean that these technical features cannot be combined to achieve a beneficial effect.

What is claimed is:

1. A method for data transmission in a base station of a communication network with a user equipment dominated by the base station, wherein the communication network comprises a cellular network and an assistant wireless network dedicated to the cellular network; the assistant wireless network comprises at least one assistant wireless network access node; and the at least one assistant wireless network access node is connected to the base station via a wired or wireless link, wherein the method comprises:

maintaining a first control channel in the cellular network between the base station and the user equipment, wherein the first control channel is used for exchanging with the user equipment control signalling of a data channel in the cellular network;

establishing a second control channel for exchanging with the user equipment the control signalling of an emulation data channel, wherein the second control channel connects the base station to the user equipment via the assistant wireless network and the wired or wireless link between the assistant wireless network access node and the base station;

exchanging control signalling of the emulation data channel with the user equipment;

establishing the emulation data channel that connects the base station to the user equipment via the assistant wireless network and the wired or wireless link between the assistant wireless network access node and the base station; and at least receiving data from or sending data to the user equipment via the emulation data channel;

wherein the exchanging further comprises:

exchanging the control signalling of the emulation data channel with the user equipment via the first control channel;

and wherein the method further comprises, between the exchanging and the establishing the emulation data channel:

based on a first predetermined condition, selecting the data channel in the cellular network and/or the emulation data channel to receive data from or send data to the user equipment, and sending to the user equipment an instruction for indicating a selection result, wherein the first predetermined condition comprises at least one of the following items:

load condition between the data channel in the cellular network and the emulation data channel;
a data type of a traffic; or
power consumption of the user equipment.

2. The method according to claim 1, further comprising, before the maintaining:

receiving from the user equipment a request for registering with the assistant wireless network;
authenticating the user equipment; and
executing the maintaining, exchanging, establishing and at least receiving data from or sending data to the user equipment via the emulation data channel after the user equipment being authenticated.

3. The method according to claim 1, wherein the first predetermined condition comprises at least one of the following items:

channel quality of the data channel in the cellular network and the emulation data channel;
quality of service of the traffic.

4. The method according to claim 3, wherein the method also comprises after the at least receiving data from or sending data to the user equipment via the emulation data channel:

when a second predetermined condition is met, releasing the emulation data channel and receiving data from or sending data to the user equipment via the data channel in the cellular network, wherein the second predetermined condition comprises at least one of the following items:

cellular network resources being sufficient;
the channel quality of the emulation data channel deteriorating;
the user equipment moving apart from the assistant wireless network access node;
the user equipment moving in a high speed; or
the user equipment having released the emulation data channel.

5. The method according to claim 1, wherein the control signalling of the emulation data channel comprises at least one of the following items:

registration management information of the assistant wireless network;
establishing and releasing information of the emulation data channel;
timing information of the emulation data channel;
traffic buffering information of the emulation data channel;
a data transmission format of the emulation data channel; or
identification information of a base station end and a user equipment end of the emulation data channel.

6. The method according to claim 1, wherein the assistant wireless network comprises any one of a WiFi network, a Zigbee network and a Bluetooth network or a combination thereof.

7. The method according to claim 1, wherein the first predetermined condition comprises a load condition between the data channel in the cellular network and the emulation data channel.

8. The method according to claim 1, wherein the first predetermined condition comprises a data type of a traffic.

9. The method according to claim 1, wherein the first predetermined condition comprises a power consumption of the user equipment.

10. A method for data transmission in a user equipment of a communication network with a base station dominating the user equipment, wherein the communication network comprises a cellular network and an assistant wireless network dedicated to the cellular network; the assistant wireless network comprises at least one assistant wireless network access node; and the at least one assistant wireless network access node is connected to the base station via a wired or wireless link, wherein the method comprises:

maintaining a first control channel in the cellular network between the user equipment and the base station, wherein the first control channel is used for exchanging with the base station control signalling of a data channel in the cellular network;
establishing a second control channel that is used for exchanging with the base station the control signalling of an emulation data channel, wherein the second control channel connects the user equipment to the base station via the assistant wireless network and the wired or wireless link between the assistant wireless network access node and the base station;

exchanging control signalling of the emulation data channel with the base station;

establishing the emulation data channel that connects the user equipment to the base station via the assistant wireless network and the wired or wireless link between the assistant wireless network access node and the base station; and at least receiving data from the base station or sending data to the user equipment via the emulation data channel;

wherein the exchanging further comprises:
exchanging the control signalling of the emulation data channel with the base station via the first control channel;

wherein the method further comprises, between the exchanging and the establishing the emulation data channel:
receiving from the base station an instruction for instructing the user equipment to receive data from or send data to the base station via the data channel in the cellular network and/or the emulation data channel, wherein when the instruction instructs the user equipment to receive data from or send data to the base station via the emulation data channel, the establishing and at least receiving data from the base station or sending data to the user equipment via the emulation data channel are executed;

and wherein the method further comprises, after the at least receiving data from the base station or sending data to the user equipment via the emulation data channel:
when a predetermined condition is met, releasing the emulation data channel and receiving data from or sending data to the base station via the data channel in the cellular network, wherein the predetermined condition comprises at least one of the following items:
the user equipment moving apart from the assistant wireless network access node;
the user equipment moving in a high speed; or
the user equipment having released the emulation data channel.

11. The method according to claim 10, further comprising, before the maintaining:
sending to the base station a request for registering with the assistant wireless network;
accepting authentication of the base station;
executing the maintaining, exchanging, establishing and at least receiving data from the base station or sending data to the user equipment via the emulation data channel after the user equipment is authenticated.

12. The method according to claim 10,
a channel quality of the emulation data channel deteriorating.

13. The method according to claim 10, wherein the control signalling of the emulation data channel comprises at least one of the following items:
registration management information of the assistant wireless network;
establishing and releasing information of the emulation data channel;
timing information of the emulation data channel;
traffic buffering information of the emulation data channel;

a data transmission format of the emulation data channel; or
identification information of a base station end and a user equipment end of the emulation data channel.

14. The method according to claim 10, wherein the predetermined condition comprises the user equipment moving apart from the assistant wireless network access node.

15. The method according to claim 10, wherein the predetermined condition comprises the user equipment moving in a high speed.

16. The method according to claim 10, wherein the predetermined condition comprises the user equipment having released the emulation data channel.

17. An apparatus for data transmission in a base station of a communication network with a user equipment dominated by the base station, wherein the communication network comprises a cellular network and an assistant wireless network dedicated to the cellular network; the assistant wireless network comprises at least one assistant wireless network access node; and the at least one assistant wireless network access node is connected to the base station via a wired or wireless link, wherein the apparatus comprises:
a first maintaining device, configured to maintain a first control channel in the cellular network between the base station and the user equipment, wherein the first control channel is used for exchanging with the user equipment control signalling of a data channel in the cellular network;
the first maintaining device being further configured to establish a second control channel to exchange with the user equipment the control signaling of an emulation data channel, wherein the second control channel connects the base station to the user equipment via the assistant wireless network and the wired or wireless link between the assistant wireless network access node and the base station;
a first exchanging device, configured to exchange control signalling of the emulation data channel with the user equipment;
a first establishing device, configured to establish the emulation data channel that connects the base station to the user equipment via the assistant wireless network and the wired or wireless link between the assistant wireless network access node and the base station; and
a first transmitting device, configured to at least receive data from or send data to the user equipment via the emulation data channel;
wherein the first exchanging device is further configured to:
exchange the control signalling of the emulation data channel with the user equipment via the first control channel;
and wherein the apparatus further comprises a selecting device configured to:
based on a first predetermined condition, select the data channel in the cellular network and/or the emulation data channel to receive data from or send data to the user equipment, and send to the user equipment an instruction for indicating a selection result, wherein the first predetermined condition comprises at least one of the following items:
load condition between the data channel in the cellular network and the emulation data channel;
a data type of a traffic; or
power consumption of the user equipment.

18. An apparatus for data transmission in a user equipment of a communication network with a base station dominating the user equipment, wherein the communication network comprises a cellular network and an assistant wireless network dedicated to the cellular network; the assistant wireless network comprises at least one assistant wireless network access node; and the at least one assistant wireless network access node is connected to the base station via a wired or wireless link, wherein the apparatus comprises:
- a maintaining device, configured to maintain a first control channel in the cellular network between the user equipment and the base station, wherein the first control channel is used for exchanging with the base station control signalling of a data channel in the cellular network;
- the maintaining device being further configured to establish a second control channel to exchange with the user equipment the control signaling of an emulation data channel, wherein the second control channel connects the base station to the user equipment via the assistant wireless network and the wired or wireless link between the assistant wireless network access node and the base station;
- an exchanging device, configured to exchange control signalling of the emulation data channel with the base station;
- a establishing device, configured to establish the emulation data channel that connects the user equipment to the base station via the assistant wireless network and the wired or wireless link between the assistant wireless network access node and the base station; and
- a transmitting device, configured to at least receive data from the base station or send data to the user equipment via the emulation data channel;

wherein the exchanging device is further configured to:
  exchange the control signalling of the emulation data channel with the base station via the first control channel;
wherein apparatus further comprises a receiving device configured to:
  receive from the base station an instruction for instructing the user equipment to receive data from or send data to the base station via the data channel in the cellular network and/or the emulation data channel;
wherein the establishing device is further configured to:
  when the instruction instructs the user equipment to receive data from or send data to the base station via the emulation data channel, establish the emulation data channel;
wherein the transmitting device is further configured to:
  when the instruction instructs the user equipment to receive data from or send data to the base station via the emulation data channel, at least receive data from the base station or sending data to the user equipment via the emulation data channel;
and wherein the apparatus further comprises a releasing device configured to:
  when a predetermined condition is met, release the emulation data channel and receive data from or send data to the base station via the data channel in the cellular network, wherein the predetermined condition comprises at least one of the following items:
    the user equipment moving apart from the assistant wireless network access node;
    the user equipment moving in a high speed; or
    the user equipment having released the emulation data channel.

* * * * *